US011865831B2

(12) United States Patent
Wulf et al.

(10) Patent No.: US 11,865,831 B2
(45) Date of Patent: Jan. 9, 2024

(54) CYLINDER SLEEVE HAVING A LOW CARBON DIOXIDE RELEASE AND METHOD OF MAKING THE SAME

(71) Applicant: tesa SE, Norderstedt (DE)

(72) Inventors: Stefan Wulf, Mönchengladbach (DE); Alexander Engel, Hamburg (DE); Steffen Fichtelmann, Hamburg (DE); Joerg Lang, Ludwigshafen (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 17/816,029

(22) Filed: Jul. 29, 2022

(65) Prior Publication Data

US 2023/0052373 A1 Feb. 16, 2023

(30) Foreign Application Priority Data

Jul. 30, 2021 (EP) .................................... 21188763

(51) Int. Cl.
*B41F 7/20* (2006.01)
*B41F 13/10* (2006.01)
*B41N 6/00* (2006.01)

(52) U.S. Cl.
CPC ................ *B41F 7/20* (2013.01); *B41F 13/10* (2013.01); *B41N 6/00* (2013.01)

(58) Field of Classification Search
CPC .................................. B41N 6/00; B41F 13/10
See application file for complete search history.

(56) References Cited

U.S. PATENT DOCUMENTS

2006/0137551 A1 6/2006 Piolat
2010/0098934 A1* 4/2010 Stearns .................. B32B 27/40 428/319.3

FOREIGN PATENT DOCUMENTS

EP 2292441 A1 3/2011

OTHER PUBLICATIONS

European Patent Office, Extended European Search Report, dated Dec. 16, 2022, 4 pages.

* cited by examiner

*Primary Examiner* — Joshua D Zimmerman
(74) *Attorney, Agent, or Firm* — Price Heneveld LLP

(57) ABSTRACT

A cylinder sleeve, comprising a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a cylindrical polyurethane layer; and one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein the cylinder base sleeve according to (a) exhibits a carbon dioxide release coefficient $R_{CO2}$ in the range of from 0 to 9.5 ppmv $cm^{-3}$ $d^{-1}$.

20 Claims, No Drawings

CYLINDER SLEEVE HAVING A LOW CARBON DIOXIDE RELEASE AND METHOD OF MAKING THE SAME

CROSS-REFERENCE TO RELATED APPLICATION

This application claims the benefit of priority under 35 U.S.C. § 119 of European Patent Application No. 21188763.3, entitled CYLINDER SLEEVE HAVING A LOW CARBON DIOXIDE RELEASE, and filed Jul. 30, 2021, the contents of which are relied upon and incorporated herein by reference in their entirety.

FIELD OF THE DISCLOSURE

The present invention relates to a process for preparing a cylinder sleeve wherein the process particularly comprises a specific tempering step of said cylinder sleeve. Further, the present invention relates to a cylinder sleeve obtainable and/or obtained by said process. Therefore, the present invention also relates to a cylinder sleeve particularly exhibiting a comparatively reduced $CO_2$ release. In addition thereto, the present invention relates to a use of said cylinder sleeve, preferably in a printing process, and more preferably in a flexographic printing process.

BACKGROUND

In a typical printing process, a printing plate is mounted on a cylinder sleeve. Said printing plate is usually fixed by an adhesive layer which was applied on the cylinder sleeve in advance. Specific embodiments of said adhesive layer allow repeated mounting and de-mounting of a printing plate for repeated use of the cylinder sleeve. To ensure high quality printing, the cylinder sleeve has to meet specific requirements, in particular with respect to a specific total indicated runout and a specifically constant sleeve diameter. Otherwise, defects in printing may occur leading to an inferior printing quality.

US 2006/137551 A1 discloses a composite compensator sleeve designed specifically to compensate for the dimensional difference that exists between a rotational drive carrier and a printing form, wherein said sleeve comprises a tubular nickel-based metal internal base, an external layer of a hard elastomer material, and an intermediate layer of a soft elastomer material placed between the metal internal base and the hard external layer. Further, a flexographic printing process is disclosed therein.

EP 2292441 A1 discloses a method of making a printing blanket including a cast polyurethane layer.

It has been found that inferior printing quality can occur, in particular if a cylinder sleeve having an adhesive layer applied thereon is used over a longer period, and especially when said cylinder sleeve having an adhesive layer applied thereon was repeatedly used. It has been found that blister formation between the adhesive layer and the upper layer of the cylinder sleeve was responsible for said inferior printing quality because such blisters can have a negative impact on the consistent fixation of the printing plate, thereby disadvantageously affecting the quality of the printing.

Said blisters can be formed due to gas released by the cylinder sleeve which cannot permeate through the adhesive layer. Said blister formation can lead to variances of the total indicated runout and of the diameter of the sleeve, respectively, such that a high quality printing process cannot be ensured.

Therefore, the need exists to provide a cylinder sleeve which has a reduced carbon dioxide ($CO_2$) release such that, in particular, blister formation can be significantly reduced or even essentially avoided when an adhesive layer is applied on the cylinder sleeve.

SUMMARY OF THE DISCLOSURE

It has surprisingly been found that by subjecting a cylinder sleeve to a specific treatment step, the resulting cylinder sleeve exhibits a significantly reduced $CO_2$ release. Thus, the resulting cylinder sleeve is suitable for ensuring a high quality printing process, in particular for repeated application of a printing plate thereon.

According to an aspect of the disclosure, a cylinder sleeve is provided that includes:

(a) a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a cylindrical polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto. Further, the cylinder base sleeve according to (a) exhibits a carbon dioxide release coefficient $R_{CO2}$ in the range of from 0 to 9.5 ppmv $cm^{-3}$ $d^{-1}$, $R_{CO2}$ being defined as the amount of carbon dioxide in ppmv released by the cylinder base sleeve per hour day and volume of the one or more cylindrical polyurethane layers according to (a) in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs).

According to another aspect of the disclosure, a process for preparing a cylinder sleeve is provided that includes:

(i) providing a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a polyurethane layer;

(ii) subjecting the cylinder base sleeve provided according to (i) to an air atmosphere having a temperature in the range of from 30 to 60° C. and a relative humidity in the range of from 10 to 85% at an absolute pressure in the range of from 0.8 to 1.2 bar(abs) for a period in the range of from 20 to 720 h;

(iii) optionally subjecting the cylinder base sleeve obtained according to (ii) to reconditioning conditions;

(iv) applying one or more cylindrical layers onto the outer layer of the cylinder base sleeve obtained from (ii), optionally from (iii), wherein the outermost layer applied according to (iv) is an adhesive layer for attaching a printing plate thereto; and (v) optionally applying a printing plate onto the adhesive layer according to (iv).

According to a further aspect of the disclosure, a method for preparing a multitude of cylinder sleeves is provided that includes:

(i) providing a multitude of cylinder base sleeves, wherein each cylinder base sleeve consists of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane;

(ii) subjecting each cylinder base sleeve provided according to (i) to an air atmosphere having a temperature in the range of from 30 to 60° C. and a relative humidity in the range of from 30 to 80% at an absolute pressure in the range of from 0.8 to 1.2 bar(abs) for a period in the range of from 20 to 720 h;

(iii) optionally subjecting each cylinder base sleeve obtained according to (ii) to reconditioning conditions;

(iv) applying one or more cylindrical layers onto the outer layer of each cylinder base sleeve obtained from (ii), optionally from (iii), wherein the outermost layer applied according to (iv) is an adhesive layer for attaching a printing plate thereto; and (v) optionally applying a printing plate onto each adhesive layer according to (iv).

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims.

The present invention relates to a cylinder sleeve, comprising:

(a) a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane; and (b) one or more cylindrical layers, arranged on top of each other, wherein the innermost cylindrical layer is applied on a lateral surface of the cylinder base sleeve according to (a) and wherein an outermost layer of said one or more cylindrical layers is an adhesive layer for attaching a printing plate thereto;

wherein the cylinder base sleeve according to (a) exhibits a carbon dioxide release coefficient $R_{CO2}$ in the range of from 0 to 9.5 ppmv cm$^{-3}$ d$^{-1}$, $R_{CO2}$ being defined as the amount of carbon dioxide in ppmv released by the cylinder base sleeve per day and volume of the one or more cylindrical polyurethane layers according to (a) in cm$^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs), determined as described in Reference Example 1.

The physical unit "d" (day) as used throughout the present invention, such as in the context of the carbon dioxide release coefficient $R_{CO2}$, refers to a period of time of 24 hours.

Preferably, the carbon dioxide release coefficient $R_{CO2}$ of the cylinder base sleeve according to (a) is in the range of from 0 to 9 ppmv cm$^{-3}$ d$^{-1}$, more preferably in the range of from 0 to 8 ppmv cm$^{-3}$ d$^{-1}$, more preferably in the range of from 0 to 7 ppmv cm$^{-3}$ d$^{-1}$, more preferably in the range of from 0 to 6 ppmv cm$^{-3}$ d$^{-1}$, more preferably in the range of from 0 to 5 ppmv cm$^{-3}$ d$^{-1}$.

With respect to the cylindrical polyurethane layers according to (a), it is preferred that each of the said cylindrical polyurethane layers, independently of each other, consist from 75 to 100 weight-%, more preferably from 85 to 100 weight-%, more preferably from 95 to 100 weight-%, of polyurethane.

Further, it is preferred that at least one of the one or more cylindrical polyurethane layers according to (a) further comprises at least one additive, wherein the at least one additive is preferably one or more of a pigment and a conductivity amplifier, more preferably one or more of carbon black and carbon nanotubes.

No particular restriction applies with respect to the thickness of the one or more cylindrical polyurethane layers according to (a). It is preferred that, independently of each other, each of the one or more cylindrical polyurethane layers according to (a) has a thickness in the range of from 25 micrometer to 150 mm, more preferably in the range of from 50 micrometer to 110 mm, more preferably in the range of from 100 micrometer to 100 mm.

Further, it is preferred that, independently of each other, each of the one or more cylindrical polyurethane layers according to (a) has a density in the range of from 0.01 to 2.0 g cm$^{-3}$, more preferably in the range of from 0.05 to 1.75 g cm$^{-3}$, more preferably in the range of from 0.1 to 1.5 g cm$^{-3}$.

No particular restriction applies with respect to the number of cylindrical polyurethane layers according to (a). It is preferred that the cylinder base sleeve according to (a) comprises from 1 to 10, more preferably from 1 to 8, more preferably from 1 to 6, more preferably from 1 to 4, cylindrical polyurethane layers, such as 1 or 2 or 3 or 4 cylindrical polyurethane layers.

The cylinder base sleeve according to (a) may further comprise, in addition to the one or more cylindrical polyurethane layers, one or more further cylindrical layers. It may be preferred that independently of each other, from 0 to 1 weight-%, more preferably from 0 to 0.5 weight-%, more preferably from 0 to 0.2 weight-%, more preferably from 0 to 0.1 weight-% of each of said further cylindrical layers consist of polyurethane, based on the total weight of the respective cylindrical layer.

Further in the case where the cylinder base sleeve according to (a) further comprises one or more further cylindrical layers, in addition to the one or more cylindrical polyurethane layers, it is preferred that said one or more further cylindrical layers comprises one or more of a glass fiber, a carbon fiber, an unsaturated polyester resin, an epoxy resin, a vinyl ester resin, a UV polymerizable resin, more preferably an acrylate-based UV polymerizable resin, wherein said one or more further cylindrical layers preferably comprise, more preferably consist of, a glass fiber reinforced composite comprising one or more of an unsaturated polyester resin, an epoxy resin, a vinyl ester resin, a UV polymerizable resin, preferably an acrylate-based UV polymerizable resin, and a carbon fiber reinforced composite comprising one or more of an unsaturated polyester resin, an epoxy resin, a vinyl ester resin, and a UV polymerizable resin, preferably an acrylate-based UV polymerizable resin.

No particular restriction applies with respect to the number of cylindrical layers of the cylinder base sleeve according to (a). In particular, the cylinder base sleeve according to (a) can further comprise one or more further cylindrical layers in addition to the one or more cylindrical polyurethane layers. It is preferred that the cylinder base sleeve according to (a) consists of from 2 to 10 cylindrical layers, more preferably of from 2 to 8 cylindrical layers, more preferably of from 2 to 6 cylindrical layers.

Thus, particularly considering that the cylinder base sleeve according to (a) may further comprise one or more further cylindrical layers, in addition to the one or more cylindrical polyurethane layers, and that the number of cylindrical layers of the cylinder base sleeve according to (a) may vary, depending on the specific requirements of a cylinder sleeve, different alternatives are possible with respect to a specific arrangement of said cylindrical layers. In particular, the following six embodiments are preferred in this regard.

According to a first alternative, it is preferred that the cylinder base sleeve according to (a) consists of two (2) cylindrical layers on top of each other, being a first cylindrical layer and a second cylindrical layer, wherein the first cylindrical layer is the innermost layer and the second cylindrical layer is the outermost layer, wherein the first cylindrical layer comprises a glass fiber, preferably a glass fiber reinforced composite as defined hereinabove, and the second cylindrical layer comprises polyurethane, wherein the second cylindrical layer preferably is a cylindrical polyurethane layer as defined in one or more of the particular and preferred embodiments hereinabove.

According to a second alternative, it is preferred that the cylinder base sleeve according to (a) consists of four (4) cylindrical layers on top of each other, being a first cylindrical layer, wherein the first cylindrical layer is the innermost layer, a second cylindrical layer on the first cylindrical layer, a third cylindrical layer on the second cylindrical layer, and a fourth cylindrical layer on the third cylindrical layer, wherein the first cylindrical layer comprises a glass fiber, preferably a glass fiber reinforced composite as defined in one or more of the particular and preferred embodiments hereinabove, the second cylindrical layer comprises a polyurethane, wherein the second cylindrical layer preferably is a cylindrical polyurethane layer as defined in one or more of the particular and preferred embodiments hereinabove, wherein the polyurethane is preferably a soft foam, the third cylindrical layer comprises a glass fiber, preferably a glass fiber reinforced composite as defined in one or more of the particular and preferred embodiments hereinabove, and the fourth cylindrical layer comprises a polyurethane, wherein the fourth cylindrical layer preferably is a cylindrical polyurethane layer as defined in one or more of the particular and preferred embodiments hereinabove.

According to a third alternative, it is preferred that the cylinder base sleeve according to (a) consists of five (5) cylindrical layers on top of each other, being a first cylindrical layer, wherein the first cylindrical layer is the innermost layer, a second cylindrical layer on the first cylindrical layer, a third cylindrical layer on the second cylindrical layer, a fourth cylindrical layer on the third cylindrical layer, and a fifth cylindrical layer on top of the fourth cylindrical layer, wherein the first cylindrical layer comprises a glass fiber, preferably a glass fiber reinforced composite as defined in one or more of the particular and preferred embodiments hereinabove, the second cylindrical layer comprises a polyurethane, wherein the second cylindrical layer preferably is a cylindrical polyurethane layer as defined in one or more of the particular and preferred embodiments hereinabove, wherein the polyurethane is preferably a soft foam, the third cylindrical layer comprises a glass fiber, preferably a glass fiber reinforced composite as defined in one or more of the particular and preferred embodiments hereinabove, the fourth cylindrical layer comprises polyurethane, wherein the fourth cylindrical layer preferably is a cylindrical polyurethane layer as defined in one or more of the particular and preferred embodiments hereinabove, wherein the polyurethane is preferably a hard foam, and the fifth cylindrical layer comprises a polyurethane, wherein the fifth cylindrical layer preferably is a cylindrical polyurethane layer as defined in one or more of the particular and preferred embodiments hereinabove.

According to a fourth alternative, it is preferred that the cylinder base sleeve according to (a) consists of four (4) cylindrical layers on top of each other, being a first cylindrical layer, wherein the first cylindrical layer is the innermost layer, a second cylindrical layer on the first cylindrical layer, a third cylindrical layer on the second cylindrical layer, and a fourth cylindrical layer on the third cylindrical layer, wherein the first cylindrical layer comprises a glass fiber, preferably a glass fiber reinforced composite as defined in one or more of the particular and preferred embodiments hereinabove, the second cylindrical layer comprises a polyurethane, wherein the second cylindrical layer preferably is a cylindrical polyurethane layer as in one or more of the particular and preferred embodiments hereinabove, wherein the polyurethane is preferably a soft foam, the third cylindrical layer comprises a glass fiber, preferably a glass fiber reinforced composite as defined in one or more of the particular and preferred embodiments hereinabove, and the fourth cylindrical layer comprises a polyurethane, wherein the fourth cylindrical layer preferably is a cylindrical polyurethane layer as defined in one or more of the particular and preferred embodiments hereinabove.

According to a fifth alternative, it is preferred that the cylinder base sleeve according to (a) consists of five (5) cylindrical layers on top of each other, being a first cylindrical layer, wherein the first cylindrical layer is the innermost layer, a second cylindrical layer on the first cylindrical layer, a third cylindrical layer on the second cylindrical layer, a fourth cylindrical layer on the third cylindrical layer, and a fifth cylindrical layer on top of the fourth cylindrical layer, wherein the first cylindrical layer comprises a glass fiber, preferably a glass fiber reinforced composite as defined in one or more of the particular and preferred embodiments hereinabove, the second cylindrical layer comprises a polyurethane, wherein the second cylindrical layer preferably is a cylindrical polyurethane layer as defined in one or more of the particular and preferred embodiments hereinabove, wherein the polyurethane is preferably a soft foam, the third cylindrical layer comprises a polyurethane, wherein the third cylindrical layer is a cylindrical polyurethane layer as defined in one or more of the particular and preferred embodiments hereinabove, wherein the polyurethane is preferably a hard foam, the fourth cylindrical layer comprises a glass fiber, preferably a glass fiber reinforced composite as defined in one or more of the particular and preferred embodiments hereinabove, and the fifth cylindrical layer comprises a polyurethane, wherein the fifth cylindrical layer preferably is a cylindrical polyurethane layer as defined in one or more of the particular and preferred embodiments hereinabove.

According to a sixth alternative, it is preferred that the cylinder base sleeve according to (a) consists of six (6) cylindrical layers on top of each other, being a first cylindrical layer, wherein the first cylindrical layer is the innermost layer, a second cylindrical layer on the first cylindrical layer, a third cylindrical layer on the second cylindrical layer, a fourth cylindrical layer on the third cylindrical layer, a fifth cylindrical layer on top of the fourth cylindrical layer, and a sixth cylindrical layer on the fifth cylindrical layer, wherein the first cylindrical layer comprises a glass fiber, preferably a glass fiber reinforced composite as defined in one or more of the particular and preferred embodiments hereinabove, the second cylindrical layer comprises a polyurethane, wherein the second cylindrical layer preferably is a cylindrical polyurethane layer as defined in one or more of the particular and preferred embodiments hereinabove, wherein the polyurethane is preferably a soft foam, the third cylindrical layer comprises a glass fiber, preferably a glass fiber reinforced composite as defined in one or more of the particular and preferred embodiments hereinabove, the fourth cylindrical layer comprises a polyurethane, wherein the fourth cylindrical layer is a cylindrical polyurethane layer as defined in one or more of the particular and preferred embodiments hereinabove, wherein the polyurethane is preferably a hard foam, the fifth cylindrical layer comprises a glass fiber, preferably a glass fiber reinforced composite as defined in one or more of the particular and preferred embodiments hereinabove, and the sixth cylindrical layer comprises a polyurethane, wherein the sixth cylindrical layer preferably is a cylindrical polyurethane layer as defined in one or more of the particular and preferred embodiments hereinabove.

The cylinder sleeve according to the present invention comprises an adhesive layer according to (b). It is preferred that the adhesive layer according to (b) comprises a polymer, wherein the polymer is preferably obtainable or obtained by crosslinking one or more compounds having two or more ethylenically unsaturated groups, wherein the one or more compounds having two or more ethylenically unsaturated groups are preferably selected from the group consisting of:

I. one or more compounds according to formula (I):

$$R^3—OC(O)—NH—R^1—[NH—C(O)—O—R^2—O—C(O)—NH—R^5]_n—NH—C(O)O—R^4 \quad (I)$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

II. one or more compounds according to formula (II):

$$JY_m \quad (II)$$

wherein 0.1 is an m-valent organic group, wherein m is an integer in the range of from 2 to 100, preferably in the range of from 2 to 4, wherein each Y, independently of each other, is a group according to formula (II.1):

$$R^3—OC(O)—NH—R^1—[NH—C(O)—O—R^2—O—C(O)—NH—R^5]_n—NH—C(O)O— \quad (II.1)$$

or according to formula (II.2):

$$—OC(O)—NH—R^1—[NH—C(O)—O—R^2—O—C(O)—NH—R^5]_n—NH—C(O)O—R^4 \quad (II.2)$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

III. a compound having a polyurethane backbone, obtainable and/or obtained by reacting a tri- or higher-functional isocyanate with a diol or a tri- or higher-functional polyol;

IV. a compound having a polyurethane backbone, obtainable and/or obtained by reacting a tri- or higher-functional polyol with a diisocyanate or a tri- or higher functional isocyanate; and V. a compound, obtainable and/or obtained by reacting a diol with a diisocyanate;

wherein the two or more ethylenically unsaturated groups $R^3$ and $R^4$, independently of each other, are preferably groups according to formula (III):

$$CH_2{=}C(X)—C(O)O\text{-}L\text{-} \quad (III)$$

wherein X is hydrogen or a methyl group, wherein L is a divalent group.

It is preferred that the polymer comprised in the adhesive layer according to (b) comprises a repeating unit comprising a functional group selected from the group consisting of:

VI. homopolymers and copolymers of two or more ethylenically unsaturated compounds, wherein said ethylenically unsaturated compounds are preferably selected from the group consisting of styrenes, alkenes and polyenes having 2 to 12 carbon atoms and cycloalkenes having 3 to 12 carbon atoms, more preferably selected from the group consisting of ethylene, propylene, n-butene, isobutene, 1-pentene, 2-pentene, 2-methyl-but-1-en, 1,3-butadiene, 1,3-, 1,4- and 1,5-hexadiene, styrene, and alpha-methyl styrene, wherein said homopolymers and copolymers of polyenes may be hydrogenated or not hydrogenated, VII. a polyether polyol; and VIII. a polyester polyol.

In the case where the polymer comprised in the adhesive layer according to (b) comprises a repeating unit comprising a functional group selected from the group consisting of VI., VII., and VIII. as defined hereinabove, it is preferred that the functional group has a weight average molecular weight in the range of from 500 to 10,000 Dalton, more preferably in the range of from 1,000 to 5,000 Dalton.

Further in the case where the polymer comprised in the adhesive layer according to (b) comprises a repeating unit comprising a functional group selected from VI., VII., and VIII. as defined hereinabove, it is preferred that the one or more compounds having two or more ethylenically unsaturated groups are one or more compounds according to formula (I) or according to formula (II) as defined hereinabove, wherein a functional group according to one or more of the particular and preferred embodiments hereinabove is comprised in one of $R^1$ and $R^2$, preferably in $R^2$, wherein said functional group is preferably a hydrogenated polyene, preferably a hydrogenated polybutadiene, and wherein the other one of $R^1$ and $R^2$, preferably $R^1$, is a non-polymeric group having a molecular weight of at most 500 Dalton, preferably less than 500 Dalton, said polymeric group preferably being an aromatic group having from 6 to 20 carbon atoms or an aliphatic group having from 2 to 20 carbon atoms, said aromatic group preferably being toluene diisocyanate (TDI), methylene diphenyl diisocyanate (MDI), butane diisocyanate (BDI), hexamethylene diisocyanate (HDI), trimethyl-hexamethylene diisocyanate (TMDI), lysine ethyl ester diisocyanate (ELDI), lysine methyl ester diisocyanate (MLDI), isophorone diioocyanate (IPDI) or 1,4-cyclohexane diisocyanate (CHDI).

In the case where the adhesive layer according to (b) comprises a polymer, it is preferred that the one or more compounds having two or more ethylenically unsaturated groups further comprise one or more (meth)acrylate compounds, preferably not containing a —NHC(O)O— group, more preferably one or more (meth)acrylate compounds selected from the group consisting of:

(meth)acrylic monomers according to formula (IV.1):

$$CH_2{=}CHX{-}C(O)OR^5 \qquad (IV.1)$$

(meth)acrylic monomers according to formula (IV.2):

$$CH_2{=}CHX'{-}C(O)OR^6OC(O)CHX''{=}CH_2 \qquad (IV.2)$$

(meth)acrylic monomers according to formula (IV.3):

$$R^7{-}(OCR^8HCH_2)_{n'}{-}(OCH_2CR^8H)_{m'}{-}L'{-}OC(O){-}CX{=}CH_2 \qquad (IV.3)$$

and (meth)acrylic monomers according to formula (IV.4):

$$H_2C{=}CX{-}C(O)O{-}L''{-}(OCR^8HCH_2)_{n''}{-}(OCH_2CR^8H)_{m''}{-}L''{-}OC(O){-}CX{=}CH_2 \qquad (IV.4)$$

wherein X is H or $CH_3$;
wherein X' is H or $CH_3$;
wherein X" is H or $CH_3$;
wherein $R^5$ is H or an organic group having from 1 to 18 carbon atoms;
wherein $R^6$ is a divalent group having from 2 to 18 carbon atoms;
wherein $R^7$ is H or an alkyl group having from 1 to 6 carbon atoms;
wherein $R^8$ is H or $CH_3$;
wherein m' and m", independently of each other, are an integer from 0 to 100;
wherein n' and n", independently of each other, are an integer from 0 to 100, with the proviso that each of n'+m' and n"+m", independently of each other, are from 2 to 100; and
wherein L' and L", independently of each other, are a single bond or a divalent linking group, preferably a single bond or a $C_{1-6}$ alkylene group.

The cylinder sleeve according to the present invention comprises according to (b) one or more cylindrical layers, arranged on top of each other. In particular, the following two alternatives are preferred in this regard.

According to a first alterative, it is preferred that the cylinder sleeve comprises, according to (b), one single cylindrical layer applied on the lateral surface of the cylinder base sleeve according to (a), said one single cylindrical layer being the adhesive layer for attaching a printing plate thereto.

According to a second alternative, it is preferred that the cylinder sleeve comprises, according to (b), one or more cylindrical layers, more preferably one or two cylindrical layers, applied between the outermost adhesive layer according to (b) and the lateral surface of the cylinder base sleeve according to (a).

With respect to the second alternative, it is further preferred that at least one of said one or more cylindrical layers, more preferably of said one or two cylindrical layers, is a stabilizing layer, wherein said stabilizing layer more preferably comprises one or more of polyethylene terephthalate (PET), polyvinyl chloride (PVC), polyethylene (PE), polyamide (PA), and polypropylene (PP), more preferably PET, wherein more preferably, from 75 to 100 weight-%, more preferably from 90 to 100 weight-%, more preferably from 95 to 100 weight-%, of the stabilizing layer consist of PET. It is preferred that the stabilizing layer has a thickness in the range of from 2 to 600 micrometer, more preferably in the range of from 5 to 550 micrometer, more preferably in the range of from 10 to 500 micrometer.

Further with respect to the second alternative, it is preferred that said one or more cylindrical layers exhibit a carbon dioxide release coefficient $R_{CO2}$ in the range of from 0 to 1 ppmv $cm^{-3}$ $d^{-1}$, $R_{CO2}$ being defined as the amount of carbon dioxide in ppmv released by said one or more cylindrical layers per day and volume of said one or more cylindrical layers in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs), determined essentially as described in Reference Example 1.

Preferably, the adhesive layer according to (b) exhibits a carbon dioxide release coefficient $R_{CO2}$ in the range of from 0 to 1 ppmv $cm^{-3}$ $d^{-1}$, $R_{CO2}$ being defined as the amount of carbon dioxide in ppmv released by said one or more cylindrical layers per day and volume of said one or more cylindrical layers in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs), determined essentially as described in Reference Example 1.

With respect to the cylinder base sleeve according to the present invention, it is preferred that it has a side wall thickness in the range of from 0.5 to 200 mm, preferably in the range of from 1 to 100 mm, more preferably in the range of from 1.5 to 75 mm, more preferably in the range of from 2 to 50 mm.

No particular restriction applies with respect to the axial length of the cylinder base sleeve of the present invention. It is preferred that the cylinder sleeve according to the present invention has an axial length in the range of from 50 to 5000 mm, more preferably in the range of from 100 to 4000 mm, more preferably in the range of from 300 to 3000 mm, more preferably in the range of from 400 to 2500 mm.

Preferably, the cylinder base sleeve of the present invention has a total indicated runout of at most 90 micrometer, preferably of at most 50 micrometer, more preferably of at most 40 micrometer, wherein the total indicated runout is determined as described in DIN ISO 2768 T1 c.

Further, it is preferred that the cylinder base sleeve according to the present invention has a surface hardness in the range of from 65 to 95 Shore D, more preferably in the range of from 70 to 85 Shore D, determined as described in DIN 53505.

Further, it is preferred that the cylinder base sleeve according to the present invention has an electric resistance of at most $10^6$ Ohm, determined as described in the Directive 94/9/EC of the European Parliament and the Council of 23 Mar. 1994.

It is preferred that the deviation in the diameter of the cylinder sleeve according to the present invention is at most ±80 micrometer, preferably at most ±60 micrometer, more preferably at most ±40 micrometer. The term "deviation in the diameter" as used in the context of the present invention refers to the result of a statistically relevant number of diameter measurements over the entire axial length of the cylinder sleeve.

It is preferred that on each front end of the cylinder sleeve, an end plate is applied which covers at least the respective end wall surface of the cylinder sleeve.

It is preferred that the cylinder sleeve according to the present invention consists of the base sleeve according to (a) and the one or more cylindrical layers according to (b).

The cylinder sleeve according to the present invention is particularly suitable for application in a printing process, in particular in a flexographic printing process. Thus, it is preferred that the cylinder sleeve further comprises (c) a printing plate being applied onto the outer surface of the adhesive layer according to (b). It is preferred that the cylinder sleeve consists of the base sleeve according to (a), the one or more cylindrical layers according to (b) and the printing plate according to (c). Further, it is preferred that the printing plate has a thickness in the range of from 0.5 to 5.0 mm, more preferably in the range of from 1.0 to 3.0 mm, more preferably in the range of from 1.1 to 2.6 mm. In addition thereto, it is preferred that the cylinder sleeve comprising a printing plate according to (c) has a repeat length in the range of from 50 to 2000 mm, more preferably in the range of from 175 to 1700 mm, more preferably in the range of from 200 to 1650 mm.

Further, the present invention relates to a process for preparing a cylinder sleeve according to any one of the embodiments disclosed herein, optionally according to any one of the embodiments relating to a cylinder sleeve comprising a printing plate, said process comprising:

- (i) providing a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer;
- (ii) subjecting the cylinder base sleeve provided according to (i) to an air atmosphere having a temperature in the range of from 30 to 60° C. and a relative humidity in the range of from 10 to 85% at an absolute pressure in the range of from 0.8 to 1.2 bar(abs) for a period in the range of from 20 to 720 h;
- (iii) optionally subjecting the cylinder base sleeve obtained according to (ii) to reconditioning conditions;
- (iv) applying one or more cylindrical layers onto the outer layer of the cylinder base sleeve obtained from (ii), optionally from (iii), wherein the outermost layer applied according to (iv) is an adhesive layer for attaching a printing plate thereto; and
- (v) optionally applying a printing plate onto the adhesive layer according to (iv).

It is preferred that the air atmosphere according to (ii) has a temperature in the range of from 30 to 55° C., more preferably in the range of from 35 to 50° C.

It is preferred that the cylinder base sleeve provided according to (i) is subjected to the air atmosphere according to (ii) for a period in the range of from 34 to 528 h, preferably in the range of from 48 to 336 h.

It is preferred that the air atmosphere according to (ii) has a relative humidity in the range of from 15 to 80%, more preferably in the range of from 30 to 80%, more preferably in the range of from 35 to 75%, more preferably in the range of from 40 to 60%.

It is preferred that the cylinder base sleeve provided in (i) is subjected to the air atmosphere according to (ii) at an absolute pressure in the range of from 0.85 to 1.15 bar(abs), preferably in the range of from 0.9 to 1.1 bar(abs).

According to the present invention, the following two alternatives are preferred with respect to the temperature of the air atmosphere according to (ii), in particular in connection with the period of time for subjecting the cylinder sleeve to step (ii), the relative humidity of said air atmosphere and/or the pressure of said air atmosphere.

According to a first alternative, it is preferred to apply a comparatively high temperature, preferably with a comparatively short period of time, and further preferably with a specific relative humidity. In particular, it is preferred that the air atmosphere according to (ii) has a temperature in the range of from 45 to 55° C., more preferably in the range of from 48 to 52° C. Further, it is preferred that the cylinder base sleeve provided according to (i) is subjected to the air atmosphere according to (ii) for a period in the range of from 100 to 350 h, more preferably in the range of from 200 to 300 h, more preferably in the range of from 230 to 250 h. Further, it is preferred that the air atmosphere according to (ii) has a relative humidity in the range of from 35 to 75%, more preferably in the range of from 40 to 60%. In addition thereto, it is preferred that the cylinder base sleeve provided in (i) is subjected to the air atmosphere according to (ii) at an absolute pressure in the range of from 0.85 to 1.15 bar(abs), more preferably in the range of from 0.9 to 1.1 bar(abs).

According to a second alternative, it is preferred to apply a comparatively low temperature, preferably with a comparatively long period of time, and further preferably with a specific relative humidity.

In particular, it is preferred that the air atmosphere according to (ii) has a temperature in the range of from 35 to 45° C., more preferably in the range of from 38 to 42° C. Further, it is preferred that the cylinder base sleeve provided according to (i) is subjected to the air atmosphere according to (ii) for a period in the range of from 375 to 600 h, more preferably in the range of from 400 to 550 h, more preferably in the range of from 450 to 500 h. Further, it is preferred that the air atmosphere according to (ii) has a relative humidity in the range of from 35 to 75%, more preferably in the range of from 40 to 60%. In addition thereto, it is preferred that the cylinder base sleeve provided in (i) is subjected to the air atmosphere according to (ii) at an absolute pressure in the range of from 0.85 to 1.15 bar(abs), more preferably in the range of from 0.9 to 1.1 bar(abs).

According to the present invention, it is preferred that the process for preparing a cylinder sleeve according to any one of the embodiments disclosed herein comprises subjecting the cylinder base sleeve obtained according to (ii) to reconditioning conditions according to (iii). It is preferred that the reconditioning conditions according to (iii) comprise an air atmosphere and a temperature of the air atmosphere in the range of from 15 to 25° C. Further, it is preferred that the cylinder base sleeve obtained according to (ii) is subjected to reconditioning conditions according to (iii) for a period in the range of from for 6 to 72 h, more preferably in the range of from 12 to 36 h, more preferably in the range of from 20 to 28 h.

As disclosed above with respect to a cylinder sleeve according to the present invention, it is preferred that said cylinder sleeve is particularly suitable for application in a printing process, in particular in a flexographic printing process. Thus, it is preferred that the process further comprises (v) applying a printing plate onto the adhesive layer according to (iv).

Furthermore, the present invention relates to a cylinder sleeve, obtainable or obtained by a process according to any one of the embodiments disclosed herein.

Further, the present invention relates to a cylinder sleeve, obtainable or obtained by a process according to any one of the embodiments disclosed herein, wherein the process comprises (v) applying a printing plate onto the adhesive layer according to (iv).

Further, the present invention relates to a cylinder sleeve, preferably the cylinder sleeve according to any one of the embodiments disclosed herein, for use in a printing process, preferably for use in a flexographic printing process.

Further, the present invention relates to a cylinder sleeve, preferably the cylinder sleeve according to any one of the embodiments disclosed herein, wherein the cylinder sleeve comprises a printing plate, for use in a printing process, preferably for use in a flexographic printing process.

Yet further, the present invention relates to a use of a cylinder sleeve according to any one of the embodiment disclosed herein in a printing process, preferably in a flexographic printing process.

Yet further, the present invention relates to a use of a cylinder sleeve according to any one of the embodiments disclosed herein, wherein the cylinder sleeve comprises a printing plate, in a printing process, preferably in a flexographic printing process.

Yet further, the present invention relates to a printing process, preferably a flexographic printing process, wherein a cylinder sleeve according to any one of the embodiments disclosed herein is employed.

Yet further, the present invention relates to a printing process, preferably a flexographic printing process, wherein a cylinder sleeve according to any one of the embodiments disclosed herein, and comprising a printing plate, is employed.

Yet further, the present invention relates to a use of a process according to any one of the embodiments disclosed herein for preparing a multitude of cylinder sleeves, wherein each cylinder sleeve comprises:

(a) a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein for each cylinder sleeve, the deviation in the diameter of said cylinder sleeve is at most ±80 micrometer, preferably at most ±60 micrometer, more preferably at most ±40 micrometer.

Yet further, the present invention relates to a method for preparing a multitude of cylinder sleeves, wherein each cylinder sleeve of this multitude comprises:

(a) a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein for each cylinder sleeve, the deviation in the diameter of said cylinder sleeve is at most ±80 micrometer, preferably at most ±60 micrometer, more preferably at most ±40 micrometer;

said method comprising:

(i) providing a multitude of cylinder base sleeves, wherein each cylinder base sleeve consists of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane;

(ii) subjecting each cylinder base sleeve provided according to (i) to an air atmosphere having a temperature in the range of from 30 to 60° C. and a relative humidity in the range of from 30 to 80% at an absolute pressure in the range of from 0.8 to 1.2 bar(abs) for a period in the range of from 20 to 720 h;

(iii) optionally subjecting each cylinder base sleeve obtained according to (ii) to reconditioning conditions; and (iv) applying one or more cylindrical layers onto the outer layer of each cylinder base sleeve obtained from (ii), optionally from (iii), wherein the outermost layer applied according to (iv) is an adhesive layer for attaching a printing plate thereto.

Yet further, the present invention relates to a multitude of cylinder sleeves, obtainable or obtained by the method disclosed above.

Yet further, the present invention relates to a use of the method disclosed above for ensuring a consistently high indicated runout quality of a multitude of cylinder base sleeves.

In the context of the present invention, the term "cylinder" refers to a circular cylinder.

In the context of the present invention, the term "total indicated runout" (TIR) refers to the maximum difference in the lengths of the radius of a cylinder base sleeve along the entire surface of said sleeve during rotation.

In the context of the present invention, the term "repeat length" refers to the circumference of a cylinder sleeve containing the base sleeve as defined in feature (a), the one or more cylindrical layers as defined in feature (b), and a printing plate as defined in feature (c).

The unit bar(abs) refers to an absolute pressure wherein 1 bar equals 105 Pa.

The present invention is further illustrated by the following set of embodiments and combinations of embodiments resulting from the dependencies and back-references as indicated. In particular, it is noted that in each instance where a range of embodiments is mentioned, for example in the context of a term such as "The cylinder sleeve of any one of embodiments 1 to 5", every embodiment in this range is meant to be explicitly disclosed for the skilled person, i.e., the wording of this term is to be understood by the skilled person as being synonymous to "The cylinder sleeve of any one of embodiments 1, 2, 3, 4 and 5". Further, it is explicitly noted that the following set of embodiments is not the set of claims determining the extent of protection, but represents a suitably structured part of the description directed to general and preferred aspects of the present invention.

Embodiment 1. A cylinder sleeve, comprising:

(a) a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a cylindrical polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein the cylinder base sleeve according to (a) exhibits a carbon dioxide release coefficient $R_{CO2}$ in the range of from 0 to 9.5 ppmv $cm^{-3}$ $d^{-1}$, $R_{CO2}$ being defined as the amount of carbon dioxide in ppmv released by the cylinder base sleeve per day and volume of the one or more cylindrical polyurethane layers according to (a) in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs), determined as described in Reference Example 1.

Embodiment 2. The cylinder sleeve of embodiment 1, wherein the carbon dioxide release coefficient $R_{CO2}$ is in the range of from 0 to 9 ppmv $cm^{-3}$ $d^{-1}$, preferably in the range of from 0 to 8 ppmv $cm^{-3}$ $d^{-1}$, more preferably in the range of from 0 to 7 ppmv $cm^{-3}$ $d^{-1}$, more preferably in the range of from 0 to 6 ppmv $cm^{-3}$ $d^{-1}$, more preferably in the range of from 0 to 5 ppmv $cm^{-3}$ $d^{-1}$.

Embodiment 3. The cylinder sleeve of embodiment 1 or 2, wherein, independently of each other, from 75 to 100 weight-%, preferably from 85 to 100 weight-%, more preferably from 95 to 100 weight-% of each of the cylindrical polyurethane layers according to (a) consist of polyurethane.

Embodiment 4. The cylinder sleeve of any one of embodiments 1 to 3, wherein at least one of the one or more cylindrical polyurethane layers according to (a) further comprises at least one additive, wherein the at least one additive is preferably one or more of a pigment and a conductivity amplifier, more preferably one or more of carbon black and carbon nanotubes.

Embodiment 5. The cylinder sleeve of any one of embodiments 1 to 4, wherein, independently of each other, each of the one or more cylindrical polyurethane layers according to (a) has a thickness in the range of from 25 micrometer to 150 mm, preferably in the range of from 50 micrometer to 110 mm, more preferably in the range of from 100 micrometer to 100 mm.

Embodiment 6. The cylinder sleeve of any one of embodiments 1 to 5, wherein, independently of each other, each of the one or more cylindrical polyurethane layers according to (a) has a density in the range of from 0.01 to 2.0 g cm', preferably in the range of from 0.05 to 1.75 g $cm^{-3}$, more preferably in the range of from 0.1 to 1.5 g $cm^{-3}$.

Embodiment 7. The cylinder sleeve of any one of embodiments 1 to 6, wherein the cylinder base sleeve according to (a) comprises from 1 to 10, preferably from 1 to 8, more preferably from 1 to 6, more preferably from 1 to 4, cylindrical polyurethane layers, such as 1 or 2 or 3 or 4 cylindrical polyurethane layers.

Embodiment 8. The cylinder sleeve of any one of embodiments 1 to 7, wherein the cylinder base sleeve according to (a) further comprises, in addition to the one or more cylindrical polyurethane layers, one or more further cylindrical layers, wherein, independently of each other, from 0 to 1 weight-% of each of said further cylindrical layers consist of polyurethane, based on the total weight of the respective cylindrical layer.

Embodiment 9. The cylinder sleeve of embodiment 8, wherein independently of each other, from 0 to 0.5 weight-%, preferably from 0 to 0.2 weight-%, more preferably from 0 to 0.1 weight-% of each of said further cylindrical layers consist of polyurethane, based on the total weight of the respective cylindrical layer.

Embodiment 10. The cylinder sleeve of embodiment 8 or 9, wherein said one or more further cylindrical layers comprises one or more of a glass fiber, a carbon fiber, an unsaturated polyester resin, an epoxy resin, a vinyl ester resin, a UV polymerizable resin, preferably an acrylate-based UV polymerizable resin, wherein said one or more further cylindrical layers preferably comprise, more preferably consist of, a glass fiber reinforced composite comprising one or more of an unsaturated polyester resin, an epoxy resin, a vinyl ester resin, a UV polymerizable resin, preferably an acrylate-based UV polymerizable resin, and a carbon fiber reinforced composite comprising one or more of an unsaturated polyester resin, an epoxy resin, a vinyl ester resin, and a UV polymerizable resin, preferably an acrylate-based UV polymerizable resin.

Embodiment 11. The cylinder sleeve of any one of embodiments 1 to 10, preferably of embodiment 10, wherein the cylinder base sleeve according to (a) consists of from 2 to 10 cylindrical layers, preferably of from 2 to 8 cylindrical layers, more preferably of from 2 to 6 cylindrical layers.

Embodiment 12. The cylinder sleeve of embodiment 11, wherein the cylinder base sleeve according to (a) consists of 2 cylindrical layers on top of each other, being a first cylindrical layer and a second cylindrical layer, wherein the first cylindrical layer is the innermost layer and the second cylindrical layer is the outermost layer, wherein the first cylindrical layer comprises a glass fiber, preferably a glass fiber reinforced composite as defined in embodiment 10, and the second layer comprises polyurethane, wherein the second cylindrical layer preferably is a cylindrical polyurethane layer as defined in embodiment 1 or in any one of embodiments 3 to 6.

Embodiment 13. The cylinder sleeve of embodiment 11, wherein the cylinder base sleeve according to (a) consists of 4 cylindrical layers on top of each other, being a first cylindrical layer, wherein the first cylindrical layer is the innermost layer, a second cylindrical layer on the first cylindrical layer, a third cylindrical layer on the second cylindrical layer, and a fourth cylindrical layer on the third cylindrical layer, wherein the first cylindrical layer comprises a glass fiber, preferably a glass fiber reinforced composite as defined in embodiment 10, the second cylindrical layer comprises a polyurethane, wherein the second cylindrical layer preferably is a cylindrical polyurethane layer as defined in embodiment 1 or in any one of embodiments 3 to 6, wherein the polyurethane is preferably a soft foam, the third cylindrical layer comprises a glass fiber, preferably a glass fiber reinforced composite as defined in embodiment 10, and the fourth cylindrical layer comprises a polyurethane, wherein the fourth cylindrical layer preferably is a cylindrical polyurethane layer as defined in embodiment 1 or in any one of embodiments 3 to 6.

Embodiment 14. The cylinder sleeve of embodiment 11, wherein the cylinder base sleeve according to (a) consists of 5 cylindrical layers on top of each other, being a first cylindrical layer, wherein the first cylindrical layer is the innermost layer, a second cylindrical layer on the first cylindrical layer, a third cylindrical layer on the second cylindrical layer, a fourth cylindrical layer on the third cylindrical layer, and a fifth cylindrical layer on top of the fourth cylindrical layer, wherein the first cylindrical layer comprises a glass fiber, preferably a glass fiber reinforced composite as defined in embodiment 10, the second cylindrical layer comprises a polyurethane, wherein the second cylindrical layer preferably is a cylindrical polyurethane layer as defined in embodiment 1 or in any one of embodiments 3 to 6, wherein the polyurethane is preferably a soft foam, the third cylindrical layer comprises a glass fiber, preferably a glass fiber reinforced composite as defined in embodiment 10, the fourth cylindrical layer comprises polyurethane, wherein the fourth cylindrical layer preferably is cylindrical polyurethane layer as defined in embodiment 1 or in any one of embodiments 3 to 6, wherein the polyurethane is preferably a hard foam, and the fifth cylindrical layer comprises a polyurethane, wherein the fifth cylindrical layer preferably is a cylindrical polyurethane layer as defined in embodiment 1 or in any one of embodiments 3 to 6.

Embodiment 15. The cylinder sleeve of embodiment 11, wherein the cylinder base sleeve according to (a) consists of 4 cylindrical layers on top of each other, being a first cylindrical layer, wherein the first cylindrical layer is the innermost layer, a second cylindrical layer on the first cylindrical layer, a third cylindrical layer on the second cylindrical layer, and a fourth cylindrical layer on the third cylindrical layer, wherein the first cylindrical layer comprises a glass fiber, preferably a glass fiber reinforced composite as defined in embodiment 10, the second cylindrical layer comprises a polyurethane, wherein the second cylindrical layer preferably is a cylindrical polyurethane layer as defined in embodiment 1 or in any one of embodiments 3 to 6, wherein the polyurethane is preferably a soft foam, the third cylindrical layer comprises a glass fiber, preferably a glass fiber reinforced composite as defined in one or more of the particular and preferred embodiments hereinabove, and the fourth cylindrical layer comprises a polyurethane, wherein the fourth cylindrical layer preferably is a cylindrical polyurethane layer as defined in embodiment 1 or in any one of embodiments 3 to 6.

Embodiment 16. The cylinder sleeve of embodiment 11, wherein the cylinder base sleeve according to (a) consists of 5 cylindrical layers on top of each other, being a first cylindrical layer, wherein the first cylindrical layer is the innermost layer, a second cylindrical layer on the first inner cylindrical layer, a third cylindrical layer on the second cylindrical layer, a fourth cylindrical layer on the third cylindrical layer, and a fifth cylindrical layer on top of the fourth cylindrical layer, wherein the first cylindrical layer comprises a glass fiber, preferably a glass fiber reinforced composite as defined in embodiment 10, the second cylindrical layer comprises a polyurethane, wherein the second cylindrical layer preferably is a cylindrical polyurethane layer as defined in embodiment 1 or in any one of embodiments 3 to 6, wherein the polyurethane is preferably a soft foam, the third cylindrical layer comprises a polyurethane, wherein the third cylindrical layer is a cylindrical polyurethane layer as defined in embodiment 1 or in any one of embodiments 3 to 6, wherein the polyurethane is preferably a hard foam, the fourth cylindrical layer comprises a glass fiber, preferably a glass fiber reinforced composite as defined in one or more of the particular and preferred embodiments hereinabove, and the fifth cylindrical layer comprises a polyurethane, wherein the fifth cylindrical layer preferably is a cylindrical polyurethane layer as defined in embodiment 1 or in any one of embodiments 3 to 6.

Embodiment 17. The cylinder sleeve of embodiment 11, wherein the cylinder base sleeve according to (a) consists of 6 cylindrical layers on top of each other, being a first cylindrical layer, a second cylindrical layer on the first inner cylindrical layer, a third cylindrical layer on the second cylindrical layer, a fourth cylindrical layer on the third cylindrical layer, a fifth cylindrical layer on top of the fourth cylindrical layer, and a sixth cylindrical layer on the fifth cylindrical layer, wherein the first cylindrical layer comprises a glass fiber, preferably a glass fiber reinforced composite as defined in embodiment 10, the second cylindrical layer comprises a polyurethane, wherein the second cylindrical layer preferably is a cylindrical polyurethane layer as defined in embodiment 1 or 3, wherein the polyurethane is preferably a soft foam, the third cylindrical layer comprises a glass fiber, preferably a glass fiber reinforced composite as defined in embodiment 10, the fourth cylindrical layer comprises a polyurethane, wherein the fourth cylindrical layer is a cylindrical polyurethane layer as defined in embodiment 1 or 3, wherein the polyurethane is preferably a hard foam, the fifth cylindrical layer comprises a glass fiber, preferably a glass fiber reinforced composite as defined in one or more of the particular and preferred embodiments hereinabove, and the sixth cylindrical layer comprises a polyurethane, wherein the sixth cylindrical layer preferably is a cylindrical polyurethane layer as defined in embodiment 1 or in any one of embodiments 3 to 6.

Embodiment 18. The cylinder sleeve of any one of embodiments 1 to 17, wherein the adhesive layer according to (b) comprises a polymer, wherein the polymer is preferably obtainable or obtained by cross-linking one or more compounds having two or more ethylenically unsaturated groups, wherein the one or more compounds having two or more ethylenically unsaturated groups are preferably selected from the group consisting of:

I. one or more compounds according to formula (I):

$$R^3\text{—OC(O)—NH—}R^1\text{—[NH—C(O)—O—}R^2\text{—O—C(O)—NH—}R^5]_n\text{—NH—C(O)O—}R^4 \quad (I)$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

II. one or more compounds according to formula (II):

$$JY_m \quad (II)$$

wherein J is an m-valent organic group, wherein m is an integer in the range of from 2 to 100, preferably in the range of from 2 to 4, wherein each Y, independently of each other, is a group according to formula (II.1):

$$R^3\text{—OC(O)—NH—}R^1\text{—[NH—C(O)—O—}R^2\text{—O—C(O)—NH—}R^5]_n\text{—NH—C(O)O—} \quad (II.1)$$

or according to formula (II.2):

$$\text{—OC(O)—NH—}R^1\text{—[NH—C(O)—O—}R^2\text{—O—C(O)—NH—}R^5]_n\text{—NH—C(O)O—}R^4 \quad (II.2)$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

III. a compound having a polyurethane backbone, obtainable and/or obtained by reacting a tri- or higher-functional isocyanate with a diol or a tri- or higher-functional polyol;

IV. a compound having a polyurethane backbone, obtainable and/or obtained by reacting a tri- or higher-functional polyol with a diisocyanate or a tri- or higher functional isocyanate; and V. a compound, obtainable and/or obtained by reacting a diol with a diisocyanate, wherein the two or more ethylenically unsaturated groups $R^3$ and $R^4$, independently of each other, are preferably groups according to formula (III):

$$CH_2{=}C(X)—C(O)O\text{-}L\text{-} \quad (III)$$

wherein X is hydrogen or a methyl group, and wherein L is a divalent group.

Embodiment 19. The cylinder sleeve of embodiment 18, wherein the polymer comprises a repeating unit comprising a functional group selected from the group consisting of:

VI. homopolymers and copolymers of two or more ethylenically unsaturated compounds, wherein said ethylenically unsaturated compounds are preferably selected from the group consisting of styrenes, alkenes and polyenes having 2 to 12 carbon atoms and cycloalkenes having 3 to 12 carbon atoms, more preferably selected from the group consisting of ethylene, propylene, n-butene, isobutene, 1-pentene, 2-pentene, 2-methyl-but-1-en, 1,3-butadiene, 1,3-, 1,4- and 1,5-hexadiene, styrene, and alpha-methyl styrene, wherein said homopolymers and copolymers of polyenes may be hydrogenated or not hydrogenated;

VII. a polyether polyol; and

VIII. a polyester polyol.

Embodiment 20. The cylinder sleeve of embodiment 19, wherein the functional group has a weight average molecular weight in the range of from 500 to 10,000 Dalton, preferably in the range of from 1,000 to 5,000 Dalton.

Embodiment 21. The cylinder sleeve of embodiment 19 or 20, wherein the one or more compounds having two or more ethylenically unsaturated groups are one or more compounds according to formula (I) or according to formula (II), wherein the functional group is comprised in one of $R^1$ and $R^2$, preferably in $R^2$, wherein said functional group is preferably a hydrogenated polyene, preferably a hydrogenated polybutadiene, and wherein the other one of $R^1$ and $R^2$, preferably $R^1$, is a non-polymeric group having a molecular weight of at most 500 Dalton, preferably less than 500 Dalton, said polymeric group preferably being an aromatic group having from 6 to 20 carbon atoms or an aliphatic group having from 2 to 20 carbon atoms, said aromatic group preferably being toluene diisocyanate (TDI), methylene diphenyl diisocyanate (MDI), butane diisocyanate (BDI), hexamethylene diisocyanate (HDI), trimethylhexamethylene diisocyanate (TMDI), lysine ethyl ester diisocyanate (ELDI), lysine methyl ester diisocyanate (MLDI), isophorone diiocyanate (IPDI) or 1,4-cyclohexane diisocyanate (CHDI).

Embodiment 22. The cylinder sleeve of any one of embodiments 18 to 21, wherein the one or more compounds having two or more ethylenically unsaturated groups further comprise one or more (meth)acrylate compounds, preferably not containing a —NHC(O)O— group, more preferably one or more (meth)acrylate compounds selected from the group consisting of:

(meth)acrylic monomers according to formula (IV.1):

$$CH_2{=}CHX—C(O)OR^5 \quad (IV.1)$$

(meth)acrylic monomers according to formula (IV.2):

$$CH_2{=}CHX'—C(O)OR^6OC(O)CHX''{=}CH_2 \quad (IV.2)$$

(meth)acrylic monomers according to formula (IV.3):

$$R^7—(OCR^8HCH_2)_{n'}—(OCH_2CR^8H)_{m'}\text{-}L'—OC(O)—CX{=}CH_2 \quad (IV.3)$$

and (meth)acrylic monomers according to formula (IV.4):

$$H_2C{=}CX—C(O)O\text{-}L''\text{-}(OCR^8HCH_2)_{n''}—(OCH_2CR^8H)_{m''}\text{-}L''—OC(O)—CX{=}CH_2 \quad (IV.4)$$

wherein X is H or $CH_3$, wherein X' is H or $CH_3$, wherein X" is H or $CH_3$, wherein $R^5$ is H or an organic group having from 1 to 18 carbon atoms, wherein $R^6$ is a divalent group having from 2 to 18 carbon atoms, wherein $R^7$ is H or an alkyl group having from 1 to 6 carbon atoms, wherein $R^8$ is H or $CH_3$, wherein m' and m", independently of each other, are an integer from 0 to 100, wherein n' and n", independently of each other, are an integer from 0 to 100, with the proviso that each of n'+m' and n"+m", independently of each other, are from 2 to 100, and wherein L' and L", independently of each other, are a single bond or a divalent linking group, preferably a single bond or a $C_{1-6}$ alkylene group.

Embodiment 23. The cylinder sleeve of any one of embodiments 1 to 22, comprising, according to (b), one single cylindrical layer applied on the lateral surface of the cylinder base sleeve according to (a), said one single cylindrical layer being the adhesive layer for attaching a printing plate thereto.

Embodiment 24. The cylinder sleeve according to any one of embodiments 1 to 22, comprising, according to (b), one or more cylindrical layers, preferably one or two cylindrical layers, applied between the outermost adhesive layer according to (b) and the lateral surface of the cylinder base sleeve according to (a).

Embodiment 25. The cylinder sleeve of embodiment 24, wherein at least one of said one or more cylindrical layers, preferably of said one or two cylindrical layers, is a stabilizing layer, wherein said stabilizing layer preferably comprises one or more of polyethylene terephthalate (PET), polyvinyl chloride (PVC), polyethylene (PE), polyamide (PA), and polypropylene (PP), more preferably PET, wherein more preferably, from 75 to 100 weight-%, more preferably from 90 to 100 weight-%, more preferably from 95 to 100 weight-%, of the stabilizing layer consist of PET.

Embodiment 26. The cylinder sleeve of embodiment 25, wherein the stabilizing layer has a thickness in the range of from 2 to 600 micrometer, preferably in the range of from 5 to 550 micrometer, more preferably in the range of from 10 to 500 micrometer.

Embodiment 27. The cylinder sleeve of any one of embodiments 24 to 26, wherein said one or more cylindrical layers and/or the adhesive layer according to (b) exhibit a carbon dioxide release coefficient $R_{CO2}$ in the range of from 0 to 1 ppmv $cm^{-3}$ $d^{-1}$, $R_{CO2}$ being defined as the amount of carbon dioxide in ppmv released by said one or more cylindrical layers per day and volume of said one or more cylindrical layers in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs), determined essentially as described in Reference Example 1.

Embodiment 28. The cylinder sleeve of any one of embodiments 1 to 27, wherein the cylinder base sleeve according to (a) has a side wall thickness in the range of from 0.5 to 200 mm, preferably in the range of from 1 to 100 mm, more preferably in the range of from 1.5 to 75 mm, more preferably in the range of from 2 to 50 mm.

Embodiment 29. The cylinder sleeve of any one of embodiments 1 to 28, wherein the cylinder base sleeve according to (a) has an axial length in the range of from 50 to 5000 mm, preferably in the range of from 100 to 4000 mm, more preferably in the range of from 300 to 3000 mm, more preferably in the range of from 400 to 2500 mm.

Embodiment 30. The cylinder sleeve of any one of embodiments 1 to 29, wherein the cylinder base sleeve according to (a) has a total indicated runout of at most 90 micrometer, preferably of at most 50 micrometer, more preferably of at most 40 micrometer, wherein the total indicated runout is determined as described in DIN ISO 2768 T1 c.

Embodiment 31. The cylinder sleeve of any one of embodiments 1 to 30, wherein the cylinder base sleeve according to (a) has a surface hardness in the range of from 65 to 95 Shore D, preferably in the range of from 70 to 85 Shore D, determined as described in DIN 53505.

Embodiment 32. The cylinder sleeve of any one of embodiments 1 to 31, wherein on each front end of the cylinder sleeve, an end plate is applied.

Embodiment 33. The cylinder sleeve of embodiment 32, wherein an end plate covers at least the respective end wall surface of the cylinder sleeve.

Embodiment 34. The cylinder sleeve of any one of embodiments 1 to 33, wherein the deviation in the diameter of the cylinder sleeve is at most ±80 micrometer, preferably at most ±60 micrometer, more preferably at most ±40 micrometer.

Embodiment 35. The cylinder sleeve of any one of embodiments 1 to 34, consisting of the base sleeve according to (a) and the one or more cylindrical layers according to (b).

Embodiment 36. The cylinder sleeve of any one of embodiments 1 to 34, further comprising (c) a printing plate being applied onto the outer surface of the adhesive layer according to (b), wherein the cylinder sleeve preferably consists of the base sleeve according to (a), the one or more cylindrical layers according to (b) and the printing plate according to (c).

Embodiment 37. The cylinder sleeve of embodiment 36, wherein the printing plate has a thickness in the range of from 0.5 to 5.0 mm, preferably in the range of from 1.0 to 3.0 mm, more preferably in the range of from 1.1 to 2.6 mm, such as in the range of from 1.1 to 1.3 mm or in the range of from 1.2 to 1.4 mm or in the range of from 1.3 to 1.5 mm or in the range of from 1.4 to 1.6 mm.

Embodiment 38. The cylinder sleeve of embodiment 36 or 37, having a repeat length in the range of from 50 to 2000 mm, preferably in the range of from 175 to 1700 mm, more preferably in the range of from 200 to 1650 mm.

Embodiment 39. A process for preparing a cylinder sleeve according to any one of embodiments 1 to 35, optionally according to any one of embodiments 36 to 38, said process comprising:

(i) providing a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer;

(ii) subjecting the cylinder base sleeve provided according to (i) to an air atmosphere having a temperature in the range of from 30 to 60° C. and a relative humidity in the range of from 10 to 85% at an absolute pressure in the range of from 0.8 to 1.2 bar(abs) fora period in the range of from 20 to 720 h;

(iii) optionally subjecting the cylinder base sleeve obtained according to (ii) to reconditioning conditions;

(iv) applying one or more cylindrical layers onto the outer layer of the cylinder base sleeve obtained from (ii), optionally from (iii), wherein the outermost layer applied according to (iv) is an adhesive layer for attaching a printing plate thereto, wherein from 0 to 1 weight-% of the adhesive layer according to (b) consist of polyurethane; and (v) optionally applying a printing plate onto the adhesive layer according to (iv).

Embodiment 40. The process of embodiment 39, wherein the air atmosphere according to (ii) has a temperature in the range of from 30 to 55° C., preferably in the range of from 35 to 50° C.

Embodiment 41. The process of embodiment 39 or 40, wherein the cylinder base sleeve provided according to (i) is subjected to the air atmosphere according to (ii) for a period in the range of from 34 to 528 h, preferably in the range of from 48 to 336 h.

Embodiment 42. The process of any one of embodiments 39 to 41, wherein the air atmosphere according to (ii) has a relative humidity in the range of from 15 to 80%, preferably in the range of from 30 to 80%, more preferably in the range of from 35 to 75%, more preferably in the range of from 40 to 60%.

Embodiment 43. The process of any one of embodiments 39 to 42, wherein the cylinder base sleeve provided in (i) is subjected to the air atmosphere according to (ii) at an absolute pressure in the range of from 0.85 to 1.15 bar(abs), preferably in the range of from 0.9 to 1.1 bar(abs).

Embodiment 44. The process of embodiment 39, wherein the air atmosphere according to (ii) has a temperature in the range of from 45 to 55° C., preferably in the range of from 48 to 52° C.

Embodiment 45. The process of embodiment 44, wherein the cylinder base sleeve provided according to (i) is subjected to the air atmosphere according to (ii) for a period in the range of from 100 to 350 h, preferably in the range of from 200 to 300 h, more preferably in the range of from 230 to 250 h.

Embodiment 46. The process of embodiment 44 or 45, wherein the air atmosphere according to (ii) has a relative humidity in the range of from 35 to 75%, preferably in the range of from 40 to 60%.

Embodiment 47. The process of any one of embodiments 44 to 46, wherein the cylinder base sleeve provided in (i) is subjected to the air atmosphere according to (ii) at an absolute pressure in the range of from 0.85 to 1.15 bar(abs), preferably in the range of from 0.9 to 1.1 bar(abs).

Embodiment 48. The process of embodiment 39, wherein the air atmosphere according to (ii) has a temperature in the range of from 35 to 45° C., preferably in the range of from 38 to 42° C.

Embodiment 49. The process of embodiment 48, wherein the cylinder base sleeve provided according to (i) is subjected to the air atmosphere according to (ii) for a period in the range of from 375 to 600 h, preferably in the range of from 400 to 550 h, more preferably in the range of from 450 to 500 h.

Embodiment 50. The process of embodiment 48 or 49, wherein the air atmosphere according to (ii) has a relative humidity in the range of from 35 to 75%, preferably in the range of from 40 to 60%.

Embodiment 51. The process of any one of embodiments 48 to 50, wherein the cylinder base sleeve provided in (i) is subjected to the air atmosphere according to (ii) at an absolute pressure in the range of from 0.85 to 1.15 bar(abs), preferably in the range of from 0.9 to 1.1 bar(abs).

Embodiment 52. The process of any one of embodiments 39 to 51, comprising subjecting the cylinder base sleeve obtained according to (ii) to reconditioning conditions according to (iii).

Embodiment 53. The process of embodiment 52, wherein the reconditioning conditions according to (iii) comprise an air atmosphere and a temperature of the air atmosphere in the range of from 15 to 25° C.

Embodiment 54. The process of embodiment 53, wherein the cylinder base sleeve obtained according to (ii) is subjected to reconditioning conditions according to (iii) for a period in the range of from 6 to 72 h, preferably in the range of from 12 to 36 h, more preferably in the range of from 20 to 28 h.

Embodiment 55. The process of any one of embodiments 39 to 54, comprising:

(v) applying a printing plate onto the adhesive layer according to (iv).

Embodiment 56. A cylinder sleeve, obtainable or obtained by a process according to any one of embodiments 39 to 54.

Embodiment 57. A cylinder sleeve, obtainable or obtained by a process according to embodiment 55.

Embodiment 58. The cylinder sleeve according to any one of embodiments 1 to 35 or 56 for use in a printing process, preferably for use in a flexographic printing process.

Embodiment 59. The cylinder sleeve according to any one of embodiments 36 to 38 or 57 for use in a printing process, preferably for use in a flexographic printing process.

Embodiment 60. Use of a cylinder sleeve according to any one of embodiments 1 to 35 or 56 in a printing process, preferably in a flexographic printing process.

Embodiment 61. Use of a cylinder sleeve according to any one of embodiments 36 to 38 or 57 in a printing process, preferably in a flexographic printing process.

Embodiment 62. A printing process, preferably a flexographic printing process, wherein a cylinder sleeve according to any one of embodiments 1 to 35 or 56 is employed.

Embodiment 63. A printing process, preferably a flexographic printing process, wherein a cylinder sleeve according to any one of embodiments 36 to 38 or 57 is employed.

Embodiment 64. Use of a process according to any one of embodiments 39 to 55 for preparing a multitude of cylinder sleeves, preferably a multitude of cylinder sleeves as defined in any one of embodiments 1 to 35, wherein each cylinder sleeve comprises:

(a) a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein for each cylinder sleeve, the deviation in the diameter of the cylinder sleeve is at most ±80 micrometer, preferably at most ±60 micrometer, more preferably at most ±40 micrometer.

Embodiment 65. A method for preparing a multitude of cylinder sleeves, preferably a multitude of cylinder sleeves as defined in any one of embodiments 1 to 35, wherein each cylinder sleeve of this multitude comprises:

(a) a cylinder base sleeve consisting of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane, and wherein the outermost cylindrical layer is a polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein for each cylinder sleeve, the deviation in the diameter of the cylinder sleeve is at most ±80 micrometer, preferably at most ±60 micrometer, more preferably at most ±40 micrometer, said method comprising:

(i) providing a multitude of cylinder base sleeves, wherein each cylinder base sleeve consists of cylindrical layers arranged on top of each other, wherein said cylindrical layers comprise one or more cylindrical polyurethane layers, wherein, independently of each other, at least 50 weight-% of each of said cylindrical polyurethane layers consist of polyurethane;

(ii) subjecting each cylinder base sleeve provided according to (i) to an air atmosphere having a temperature in the range of from 30 to 60° C. and a relative humidity in the range of from 30 to 80% at an absolute pressure in the range of from 0.8 to 1.2 bar(abs) fora period in the range of from 20 to 720 h;

(iii) optionally subjecting each cylinder base sleeve obtained according to (ii) to reconditioning conditions;

(iv) applying one or more cylindrical layers onto the outer layer of each cylinder base sleeve obtained from (ii), optionally from (iii), wherein the outermost layer applied according to (iv) is an adhesive layer for attaching a printing plate thereto; and (v) optionally applying a printing plate onto each adhesive layer according to (iv).

Embodiment 66. A multitude of cylinder sleeves, obtainable or obtained by the method according to embodiment 65.

Embodiment 67. Use of the method according to embodiment 65 for ensuring a consistently high indicated runout quality of a multitude of cylinder base sleeves.

The present invention is further illustrated by the following Reference Examples, Comparative Examples and Examples.

Reference Example 1: Determination of the Carbon Dioxide Release Coefficient $R_{CO2}$ of a Cylinder Sleeve A cylinder sleeve was cut in pieces to obtain a cylindrical piece having an axial length of 25 cm.

A container having a volume of 10.7 liter was equipped with a carbon dioxide measuring probe connected to a measurement device. The measuring probe (testo $CO_2$ sensor connected to a testo 440 climate measuring gauge) allowed to detect the temperature of the air atmosphere, the absolute pressure, the relative humidity and the $CO_2$ release of the above-mentioned cylindrical piece within the container. A high bleeched cellulose tissue (ZW-hochgebleicht; Papierfabrik Sundern GmbH, Germany) having a size of 20 cm×20 cm and a weight of about 0.8 g was soaked with 0.35±0.02 g of water and put into the container. A sample cylindrical piece was put into the container. The container was then closed and heated in a pre-heated oven to a temperature of 50° C. for evaporating the water. The water was evaporated within 1.5 h to provide a relative humidity in the container in the range of from 25 to 60%.

For determining carbon dioxide release of the cylindrical piece in the container, the container was airtight sealed and then placed in an oven for keeping the temperature of the gas atmosphere in the container at 50° C. over a measuring period of 24 h. The conditions in the container comprised a gas atmosphere having a temperature of 50° C., a relative humidity in the range of from 25 to 60% and a pressure of 1 bar(abs).

Based on the measurement results, the carbon dioxide release coefficient $R_{CO2}$ for the sample cylinder sleeve was calculated in ppmv $cm^{-3}$ $d^{-1}$.

Reference Example 2: Determination of the Presence of Bubbles

For the determination of blister/bubble formation, a sample cylinder sleeve was checked every 24 h. Especially when looked against the backlight, blister/bubble formation can be determined.

Example 1: Subjecting Cylinder Sleeves to Inventive Treatment

Various cylinder sleeves were subjected to the treatment stage according to step (ii) of the present invention in a climate chamber; specific cylinder sleeves are listed in Table 1 below. According to a first alternative, a given cylinder sleeve was stored for 120 h in a climate chamber in an air atmosphere having a relative humidity of 50% and a temperature of 40° C.; subsequently, the sleeve was subjected to a higher temperature of 50° C. which was maintained for 48 h. According to a second alternative, a given cylinder sleeve was stored for 96 h in a climate chamber in an air atmosphere having a relative humidity of 50% and a temperature of 50° C.

In Table 1 hereinunder, these cylinder sleeves are described in detail. In Table 2, in columns 1 and 2, these cylinder sleeves are referred to again. In columns 3 to 5 of Table 2, the treatment conditions according to step (ii) of the present invention are described. In columns 6 and 7 of Table 2, the reconditioning conditions are given. In the last column of Table 2, the respective carbon dioxide release coefficients are listed.

TABLE 1

Cylinder sleeves provided according to step (i) of the present invention

| | | Structure | | |
|---|---|---|---|---|
| # | Cylinder Base Sleeve Type | Number of layers | Chemical composition and sequence of layers from the inside to the outside | Total volume of polyurethane layers [$cm^3$] |
| 1 | thin walled (supplier 1) | 2 | Glass fiber composite layer (innermost layer)<br>Polyurethane layer (outermost layer) | 128 |
| 2 | thin walled (supplier 2) | 2 | Glass fiber composite layer (innermost layer)<br>Polyurethane layer (outermost layer) | 128 |
| 3 | thin walled (supplier 3) | 2 | Glass fiber composite layer (innermost layer)<br>Polyurethane layer (outermost layer) | 128 |
| 4 | thick walled (supplier 3) | 5 | Glass fiber composite layer (innermost layer)<br>Soft foam layer (PU layer)<br>Glass fiber composite layer<br>Hard foam layer (PU layer)<br>Polyurethane layer (outermost layer) | 1679 |
| 5 | thick walled (supplier 1) | | Glass fiber composite layer (innermost layer)<br>Soft foam layer (PU layer)<br>Glass fiber composite layer<br>Hard foam layer (PU layer)<br>Glass fiber composite layer<br>Polyurethane layer (outermost layer) | n.d. [1)] |
| 6 | thick walled (supplier 2) | | Glass fiber composite layer (innermost layer)<br>Soft foam layer (PU layer)<br>Glass fiber composite layer<br>Hard foam layer (PU layer)<br>Glass fiber composite layer<br>Polyurethane layer (outermost layer) | n.d. [1)] |
| 7 | medium walled (supplier 2) | 4 | Glass fiber composite layer (innermost layer)<br>Soft foam layer (PU layer)<br>Glass fiber composite layer<br>Polyurethane layer (outermost layer) | 335 |

TABLE 1-continued

Cylinder sleeves provided according to step (i) of the present invention

| # | Cylinder Base Sleeve Type | Structure: Number of layers | Structure: Chemical composition and sequence of layers from the inside to the outside | Structure: Total volume of polyurethane layers [$cm^3$] |
|---|---|---|---|---|
| 8 | medium walled (supplier 1) | 4 | Glass fiber composite layer (innermost layer)<br>Soft foam layer (PU layer)<br>Glass fiber composite layer<br>Polyurethane layer (outermost layer) | 215 |

1) n.d.: not determined

TABLE 2

Preparation of cylinder sleeves according to the present invention

| Cylinder Base Sleeve | | Conditions according to step (ii) | | | | |
|---|---|---|---|---|---|---|
| # | Total volume of polyurethane layers [$cm^3$] | Rel. Humidity [%] | Temp. [° C.] | Period [h] | $R_{CO2}$ [ppmv $cm^{-3}$ $d^{-1}$] prior to step (ii) | $R_{CO2}$ [ppmv $cm^{-3}$ $d^{-1}$] after step (ii) |
| 1 | 128 | 50 | 50 | 360 | 100 | 9 |
| 2 | 128 | 50 | 50 | 360 | 15 | 3.4 |
| 3 | 128 | 50 | 50 | 336 | 21 | 1 |
| 4 | 1679 | 50 | 50 | 216 | 10 [1] | 3.4 |
| 7 | 335 | 50 | 50 | 336 | 28 | 6 |
| 8 | 215 | 50 | 50 | 336 | 53 | 3 |

1) After 15 h and 20 min a $R_{CO2}$ value of 6.47 ppmv $cm^{-3}$ $d^{-1}$ was determined. Based on a linear extrapolation, said value corresponds to a $R_{CO2}$ value of 10 ppmv $cm^{-3}$ $d^{-1}$ after 24 h.

Example 2: Determination of Blister Formation on a Cylinder Sleeve

For comparative purposes, an adhesive layer and a foam tape with a thickness of 1.5 mm, were applied on thick-walled cylinder base sleeves #5 and #6, and medium walled cylinder base sleeves #7 and #8, each containing several layers of polyurethane, according to Table 1 above, wherein these base sleeves were not subjected to the step (ii) according to the invention. Further, the same type of adhesive layer and foam tape were applied on cylinder base sleeves #5 and #6, and medium walled cylinder base sleeves #7 and #8 which had been subjected to step (ii) according to the present invention, in particular to a temperature of 50° C. for 14 d at a relative humidity of 50%. The respectively obtained cylinder sleeves were then stored in a climate chamber in an air atmosphere having a relative humidity of 50% and a temperature of 40° C. for a duration as indicated in Table 3; during the storage, the cylinder sleeve were checked on a daily basis, as described in Reference Example 2, with respect to the formation of bubbles under the adhesive layer. Subsequently, the sleeves were optionally subjected to a higher temperature of 50° C. which was maintained for 48 h or 96 h as indicated for medium walled cylinder base sleeve #8. The cylinder sleeves were checked again with respect to the formation of bubbles, again as described in Reference Example 2. The results are described in Table 3 below.

TABLE 3

Bubble formation in cylinder sleeves according to Example 2

| Cylinder Base Sleeve # | | Bubble formation: After storage at 40° C. | Bubble formation: After storage at 50° C. |
|---|---|---|---|
| 5 | comparative | Many bubbles after 2 days | Not done due to failure at 40° C. |
| | inventive | No bubbles visible after 6 days | One small bubble on one sleeve, no bubbles visible on other sleeves |
| 6 | comparative | Many bubbles after 1-3 days | Not done due to failure at 40° C. |
| | inventive | No bubbles visible after 6 days | One small bubble on one sleeve, no bubbles visible on other sleeves |

TABLE 3-continued

Bubble formation in cylinder sleeves according to Example 2

| Cylinder Base Sleeve # | | Bubble formation: After storage at 40° C. | Bubble formation: After storage at 50° C. |
|---|---|---|---|
| 7 | comparative | Many bubbles visible after 4-7 days | Not done due to failure at 40° C. |
| | inventive | No bubbles visible after 13 days | Three very small bubbles visible on one sleeve, no bubbles visible on other sleeves |
| 8 | comparative | Many bubbles visible after 2 days | Not done due to failure at 40° C. |
| | inventive | No bubbles visible after 13 days | No bubbles visible after 4 days |

As can be seen in the above, it was found that a cylinder sleeve, after being subjected to the inventive treatment exhibits a significantly reduced $CO_2$ release. Further, it can be seen that a cylinder sleeve which was subjected to the specific inventive treatment does not show blister formation.

While exemplary embodiments and examples have been set forth for illustrative purposes, the foregoing description is not intended in any way to limit the scope of the disclosure and the appended claims. Accordingly, variations can be made to the embodiments and examples above without departing from the principles of the disclosure.

What is claimed is:

1. A cylinder sleeve, comprising:

(a) a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a cylindrical polyurethane layer; and (b) one or more cylindrical layers, arranged on top of each other, wherein the innermost cylindrical layer is applied on the lateral surface of the cylinder base sleeve according to (a) and wherein the outermost layer of said one or more cylindrical layers is an adhesive layer for attaching a printing plate thereto, wherein the cylinder base sleeve according to (a) exhibits a carbon dioxide release coefficient $R_{CO2}$ in the range of from 0 to 9.5 ppmv $cm^{-3}$ $d^{-1}$, $R_{CO2}$ being defined as the amount of carbon dioxide in ppmv released by the cylinder base sleeve per day and volume of the one or more cylindrical polyurethane layers according to (a) in $cm^3$, $R_{CO2}$ being determined in an air atmosphere exhibiting a relative humidity in the range of from 25 to 60% at a temperature of the gas atmosphere in the range of from 48 to 52° C. and at a pressure in the range of from 0.95 to 1.15 bar(abs).

2. The cylinder sleeve of claim 1, wherein, independently of each other, from 75 to 100 weight-%, of each of the cylindrical polyurethane layers according to (a) consist of polyurethane.

3. The cylinder sleeve of claim 1, wherein the cylinder base sleeve according to (a) comprises from 1 to 10 cylindrical polyurethane layers.

4. The cylinder sleeve of claim 1, wherein the cylinder base sleeve according to (a) further comprises one or more further cylindrical layers, wherein, independently of each other, from 0 to 1 weight-% of each of said further cylindrical layers consist of polyurethane, based on the total weight of the respective cylindrical layer.

5. The cylinder sleeve of claim 1, wherein the cylinder base sleeve according to (a) consists of from 2 to 10 cylindrical layers.

6. The cylinder sleeve of claim 1, wherein the adhesive layer according to (b) comprises a polymer, wherein the polymer is obtained by crosslinking one or more compounds having two or more ethylenically unsaturated groups.

7. The cylinder sleeve of claim 6, wherein the one or more compounds having two or more ethylenically unsaturated groups are selected from the group consisting of:

I. one or more compounds according to formula (I):

$$R^3\text{—OC(O)—NH—}R^1\text{—[NH—C(O)—O—}R^2\text{—O—C(O)—NH—}R^5]_n\text{—NH—C(O)O—}R^4 \quad \text{(I)}$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

II. one or more compounds according to formula (II):

$$JY_m \quad \text{(II)}$$

wherein J is an m-valent organic group, wherein m is an integer in the range of from 2 to 100, preferably in the range of from 2 to 4, wherein each Y, independently of each other, is a group according to formula (II.1):

$$R^3\text{—OC(O)—NH—}R^1\text{—[NH—C(O)—O—}R^2\text{—O—C(O)—NH—}R^5]n\text{-NH—C(O)O—} \quad \text{(II.1)}$$

or according to formula (II.2):

$$\text{—OC(O)—NH—}R^1\text{—[NH—C(O)—O—}R^2\text{—O—C(O)—NH—}R^5]n\text{-NH—C(O)O—}R^4 \quad \text{(II.2)}$$

wherein $R^3$ and $R^4$, independently of each other, are ethylenically unsaturated groups, wherein n is an integer in the range of from 1 to 1000, wherein $R^1$, $R^2$, and $R^5$, independently of each other, are divalent linking groups;

III. a compound having a polyurethane backbone, obtainable and/or obtained by reacting a tri- or higher-functional isocyanate with a diol or a tri- or higher-functional polyol;

IV. a compound having a polyurethane backbone, obtainable and/or obtained by reacting a tri- or higher-functional polyol with a diisocyanate or a tri- or higher functional isocyanate; and V. a compound, obtainable and/or obtained by reacting a diol with a diisocyanate, wherein the two or more ethylenically unsaturated groups $R^3$ and $R^4$, independently of each other, are preferably groups according to formula (III):

$$CH_2\text{=C(X)—C(O)O-L-} \quad \text{(III)}$$

wherein X is hydrogen or a methyl group, and wherein L is a divalent group.

8. The cylinder sleeve of claim 7, wherein the polymer comprises a repeating unit comprising a functional group selected from the group consisting of:

VI. homopolymers and copolymers of two or more ethylenically unsaturated compounds, wherein said ethylenically unsaturated compounds are preferably selected from the group consisting of styrenes, alkenes and polyenes having 2 to 12 carbon atoms and cycloalkenes having 3 to 12 carbon atoms, more preferably selected from the group consisting of ethylene, propylene, n-butene, isobutene, 1-pentene, 2-pentene, 2-methyl-but-1-en, 1,3-butadiene, 1,3-, 1,4- and 1,5-hexadiene, styrene, and alpha-methyl styrene, wherein said homopolymers and copolymers of polyenes may be hydrogenated or not hydrogenated;

VII. a polyether polyol; and

VIII. a polyester polyol.

9. The cylinder sleeve of claim 1, wherein the one or more cylindrical layers according to (b) are applied between the outermost adhesive layer according to (b) and a lateral surface of the cylinder base sleeve according to (a).

10. The cylinder sleeve of claim 9, wherein at least one of the one or more cylindrical layers is a stabilizing layer.

11. The cylinder sleeve of claim 10, wherein the stabilizing layer comprises one or more of polyethylene terephthalate (PET), polyvinyl chloride (PVC), polyethylene (PE), polyamide (PA), and polypropylene (PP).

12. The cylinder sleeve of claim 1, wherein the cylinder base sleeve according to (a) exhibits one or more of:

(i) a side wall thickness in the range of from 0.5 to 200 mm;

(ii) an axial length in the range of from 50 to 5000 mm;

(iii) a total indicated runout (TIR) of at most 90 micrometers, as determined from DIN ISO 2768 T1 c;

(iv) a surface hardness in the range of from 65 to 95 Shore D, as determined from DIN 53505; and (v) an electric resistance of at most $10^6$ Ohm, as determined from Directive 94/9/EC of the European Parliament and the Council of 23 Mar. 1994.

13. The cylinder sleeve of claim 1, wherein the cylinder base sleeve according to (a) exhibits three or more of:

(i) a side wall thickness in the range of from 0.5 to 200 mm;

(ii) an axial length in the range of from 50 to 5000 mm;

(iii) a total indicated runout (TIR) of at most 90 micrometers, as determined from DIN ISO 2768 T1 c;

(iv) a surface hardness in the range of from 65 to 95 Shore D, as determined from DIN 53505; and (v) an electric resistance of at most $10^6$ Ohm, as determined from Directive 94/9/EC of the European Parliament and the Council of 23 Mar. 1994.

14. The cylinder sleeve of claim 1, wherein the cylinder sleeve further comprises:

(c) a printing plate being applied onto the outer surface of the adhesive layer according to (b).

15. The cylinder sleeve of claim 1, wherein, independently of each other, each of the one or more cylindrical polyurethane layers according to (a) has a density in the range of from 0.01 to 2.0 g $cm^{-3}$.

16. A process for preparing a cylinder sleeve, comprising:

(i) providing a cylinder base sleeve consisting of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane, and wherein the outermost cylindrical base layer is a polyurethane layer;

(ii) subjecting the cylinder base sleeve provided according to (i) to an air atmosphere having a temperature in the range of from 30 to 60° C. and a relative humidity in the range of from 10 to 85% at an absolute pressure in the range of from 0.8 to 1.2 bar(abs) for a period in the range of from 20 to 720 h;

(iii) optionally subjecting the cylinder base sleeve obtained according to (ii) to reconditioning conditions;

(iv) applying one or more cylindrical layers onto the outer layer of the cylinder base sleeve obtained from (ii), optionally from (iii), wherein the outermost layer applied according to (iv) is an adhesive layer for attaching a printing plate thereto; and (v) optionally applying a printing plate onto the adhesive layer according to (iv).

17. The process of claim 16, wherein the air atmosphere according to (ii) has a temperature in the range of from 30 to 55° C., wherein the cylinder base sleeve provided according to (i) is subjected to the air atmosphere according to (ii) for a period in the range of from 34 to 528 h, wherein the air atmosphere according to (ii) has a relative humidity in the range of from 15 to 80%, and wherein the cylinder base sleeve provided in (i) is subjected to the air atmosphere according to (ii) at an absolute pressure in the range of from 0.85 to 1.15 bar(abs).

18. The process of claim 16, comprising subjecting the cylinder base sleeve obtained according to (ii) to reconditioning conditions according to (iii), wherein the reconditioning conditions according to (iii) comprise an air atmosphere and a temperature of the air atmosphere in the range of from 15 to 25° C.

19. The process of claim 18, wherein the cylinder base sleeve obtained according to (ii) is subjected to reconditioning conditions according to (iii) for a period in the range of from 6 to 72 h.

20. A method for preparing a multitude of cylinder sleeves, comprising:

(i) providing a multitude of cylinder base sleeves, wherein each cylinder base sleeve consists of cylindrical base layers arranged on top of each other, wherein said cylindrical base layers comprise one or more cylindrical polyurethane layers, wherein, independently of each other, at least 50 weight-% of each of said cylindrical polyurethane layers consist of polyurethane;

(ii) subjecting each cylinder base sleeve provided according to (i) to an air atmosphere having a temperature in the range of from 30 to 60° C. and a relative humidity in the range of from 30 to 80% at an absolute pressure in the range of from 0.8 to 1.2 bar(abs) for a period in the range of from 20 to 720 h;

(iii) optionally subjecting each cylinder base sleeve obtained according to (ii) to reconditioning conditions;

(iv) applying one or more cylindrical layers onto the outer layer of each cylinder base sleeve obtained from (ii), optionally from (iii), wherein the outermost layer applied according to (iv) is an adhesive layer for attaching a printing plate thereto; and (v) optionally applying a printing plate onto each adhesive layer according to (iv).

* * * * *